Feb. 2, 1960

H. T. PORTER 2,923,360

AUTOMATIC INVERTING AND AERATING PRESSURIZED, DRY
CHEMICAL FIRE-EXTINGUISHING SYSTEM

Filed Sept. 2, 1958

INVENTOR
HENRY T. PORTER

BY *Beale and Jones*

ATTORNEY

INVENTOR
HENRY T. PORTER
BY Beale and Jones
ATTORNEY

Feb. 2, 1960                H. T. PORTER                2,923,360
       AUTOMATIC INVERTING AND AERATING PRESSURIZED, DRY
Filed Sept. 2, 1958    CHEMICAL FIRE-EXTINGUISHING SYSTEM
                                              3 Sheets-Sheet 3
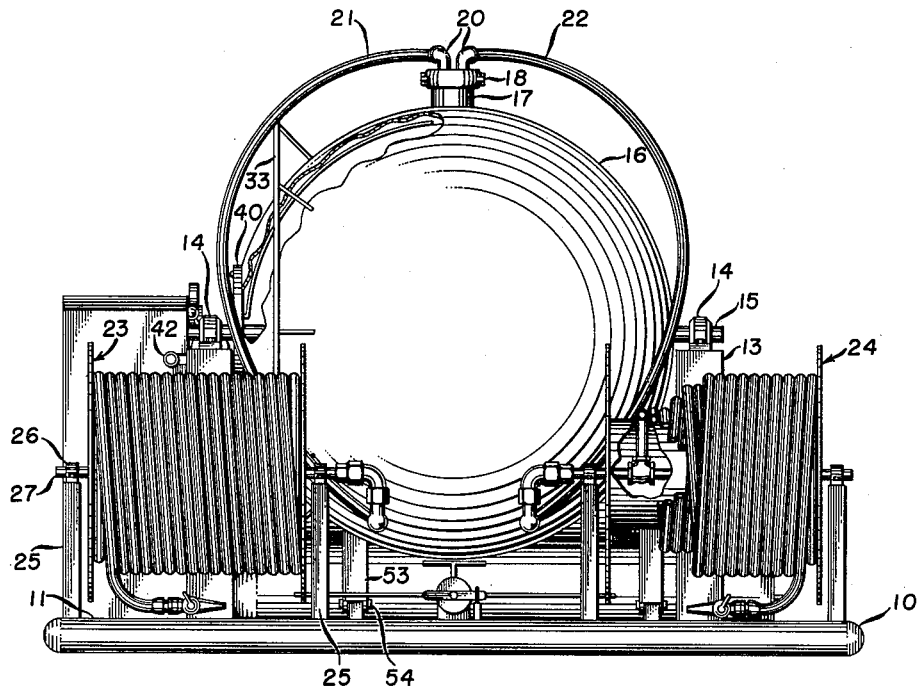
Fig. 3.
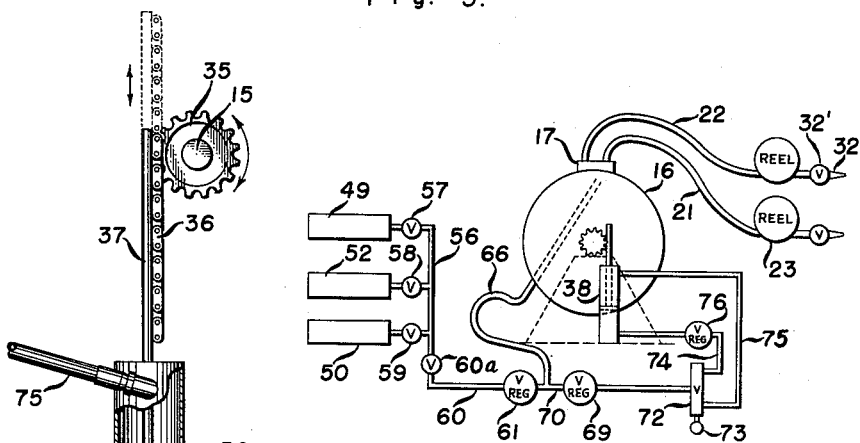
Fig. 5.
Fig. 4.
INVENTOR
HENRY T. PORTER
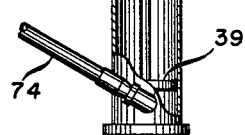
ATTORNEY United States Patent Office 2,923,360
Patented Feb. 2, 1960

2,923,360

AUTOMATIC INVERTING AND AERATING PRESSURIZED, DRY CHEMICAL FIRE-EXTINGUISHING SYSTEM

Henry T. Porter, Midland, Tex., assignor to Fire Boss, Inc., Fort Worth, Tex., a corporation of Texas Application September 2, 1958, Serial No. 758,333

7 Claims. (Cl. 169—31)

My invention is directed to improvements in a pressurized dry chemical fire-extinguishing system and particularly to means and arrangements for aerating and facilitating the ready discharge of the dry powdered chemical.

An object of the invention is to provide apparatus for storage of dry powdered chemical that is readily brought into action by inverting the container and directing gas under pressure therein to effectively move and transport the dry chemical to the place of action.

A further object of the invention is to provide apparatus wherein actuation of the main cutoff valve to a pressure system for moving and transporting dry chemical in a fire-extinguishing apparatus automatically causes the container storing the powder to be inverted and pressurized while at the same time aerates and causes the dry chemical to have a whirlpool effect within the container and to fill the hoses ready for use.

Another object of the invention is to provide in fire-fighting apparatus a pressurizing system utilizing high pressure inert gas as a source which is first reduced to an operating pressure for the powder storage tank and secondly reduced to a pressure for an operating means utilized to invert the tank whereby the powder in the tank is properly agitated and fed to discharge hoses.

A still further object of the invention is to provide in a dry chemical fire-extinguishing system continuous-flow hose reels which are connected to a powder container in such a way that they may be cleared of any residual powder after use without use of any by-pass conduits and by use of the regular pressure supply and control system.

Another object of the invention is to provide a dry powder fire-extinguishing system that is easily maintained, relatively simple, economical in operation and highly dependable for instantaneous operation.

Still further objects and the entire scope of applicability of the present invention will become apparent from the detailed description given hereinafter. It should be understood, however, that the detailed description and specific example is given by way of illustration only and, while indicating the preferred embodiment of the invention, is not given by way of limitation, since various changes and modifications within the spirit and scope of the invention will become apparent to those skilled in the art from this detailed description.

For a more complete understanding of the nature and scope of my invention, reference may be had to the following drawings in which:

Fig. 3 is an end view from the right-hand end of the apparatus as viewed in Fig. 1;

Fig. 4 is an enlarged view of the power cylinder and its rack and pinion for inverting the container; and Fig. 5 is a simplified schematic line diagram of the apparatus or system with particular reference to the pressure system.

Throughout the description, like reference numerals refer to similar parts.

Figure 1:
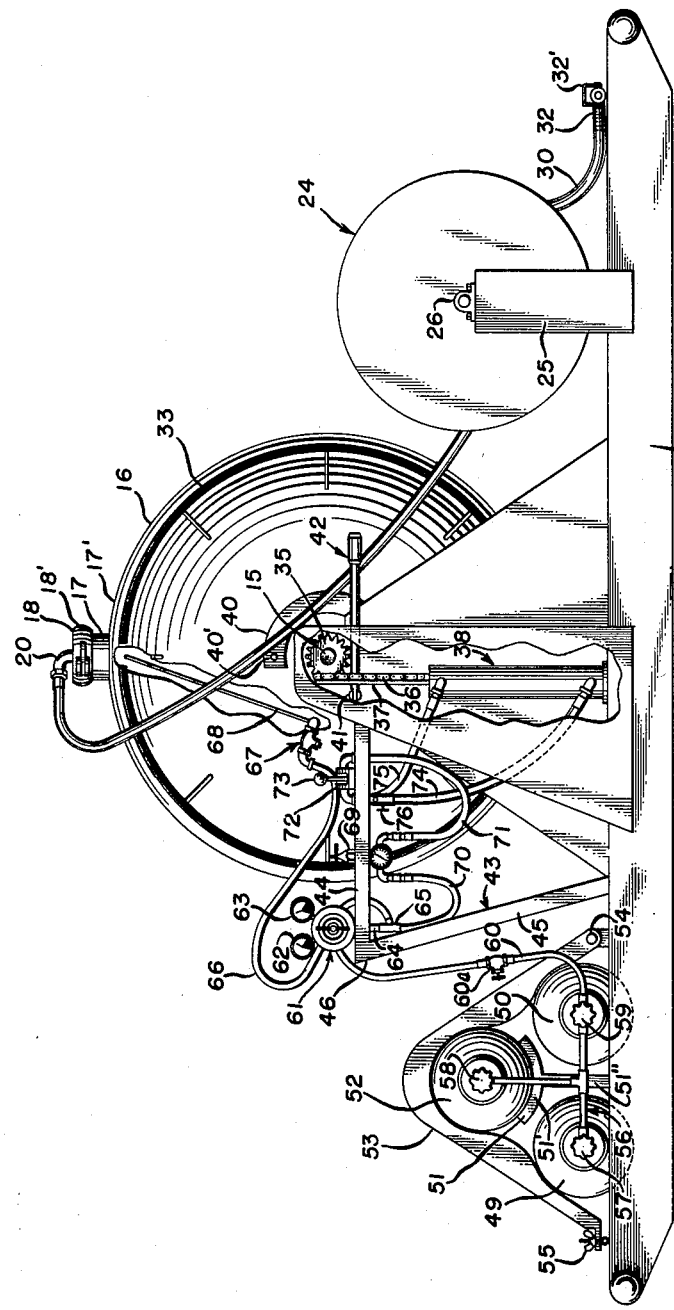
Fig. 1 is a side elevation of the apparatus.

A mounting platform 10 is provided having a floor mounting plate 11 of steel on which the apparatus is mounted. A pair of spaced apart pedestals 12 and 13 are attached to the base 10 and plate 11 and support pillow block bearings 14 which in turn have mounted therein pinions 15 welded to a spherical steel container 16 for the powdered dry chemical.

The container 16 here shown as spherical has a cylindrical filling and outlet neck 17 on the top portion 17' as shown in the drawings when the container 16 is in the upright position. This neck 17 serves for filling and discharge of the container and has a victualic cap generally indicated at 18 having a clamp 18' which is of the quick-disconnect type that secures an apertured plate 19 to the neck 17. In plate 19, is secured a pair of smooth bore elbows 20 and to each is connected flexible discharge hoses for the powder, as indicated at 21 and 22. These hoses 21 and 22 are connected to the respective reels generally indicated at 23 and 24.

Figure 2:
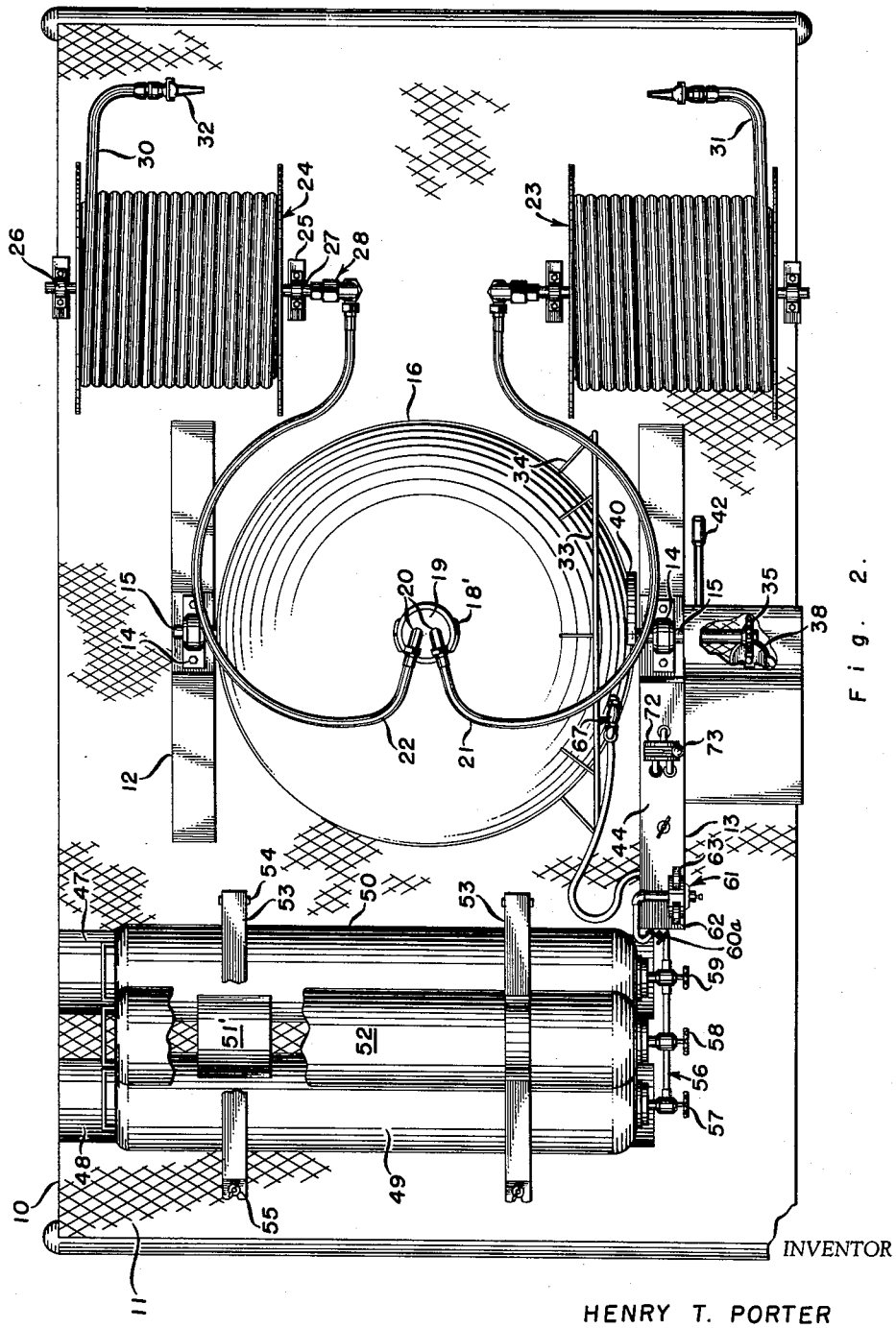
Fig. 2 is a top plan view of the apparatus shown in Fig. 1.

Reel 23, as shown in Fig. 3, is mounted on upstanding spaced apart channel iron leg members 25 welded to the platform 10 and the floor plate 11 thereof. Pillow block bearings 26 are mounted on the upper ends of the legs 25 to support the tubular shaft 27 of the reel. Reel 24 is likewise mounted. Shaft 27 is tubular and as indicated in Fig. 2 has swivel connections indicated generally at 28 to receive the hose 22. Hose 21 is likewise connected to reel 23. On the reel 24 there is received in a coiled manner the flexible discharge hose 30 and likewise on the reel 23 a flexible discharge hose 31. The hose 30 connects with the tubular shaft 27 and has a discharge nozzle generally indicated at 32 on the end thereof which has a shut-off valve having a U-shaped operating valve handle as indicated at 32' in Fig. 1. In all of the connections for the powder transfer there are smooth bores and arcuate turns so that there is no pocketing of the powder or gases.

Returning to the description of the spherical container 16, there is provided a hand grasp ring 33 in the form of a hoop which is supported by spaced apart struts 34 welded to the container 16 at one end and at their other end to the ring. This hand ring 33 may be used to help rotate the sphere 16 to invert and right the same if found necessary. Shaft 15 as shown at the bottom of Fig. 2 extends out beyond its bearing and has a pinion gear 35 mounted thereon which cooperates with a rack 36 attached to the piston rod 37 of the power cylinder generally indicated at 38. The power cylinder 38 is illustrated in Fig. 4 and has a piston 39 attached to the rod 37. This power cylinder 38 supplies motive power for quickly inverting the container 16 from upright to inverted position and back to upright position, as will be explained hereinafter.

An arcuate plate 40 is attached to the sphere 16 by welding or suitable brackets. The plate 40 has a pin-receiving aperture such as the aperture 40' therein, as shown in Fig. 1. A hand controlled lever, generally indicated at 42, is pivoted at 41 and carries a pin (not shown) intermediate the pivot and the end of the handle, the pin being moved by the handle into the aperture to latch the container in a desired position and out of the aperture to unlatch the container.

A mounting rack of channel iron is generally indicated at 43 and has a horizontal upper length 44 and an upright support portion 45 welded together at 46 and respectively to the leg 13 and base 10.

At the left-hand end of the platform 10 as shown in Fig. 1, mounting is provided for the high-pressure gas cylinders. There are shown here three cylinders with two at the base reposing in arcuate bedplates 47 and 48 which support the cylinders 49 and 50. A framework 51 having an arcuate bed portion 51' and a pedestal 51" welded to the floor plate 11 serves as a support for the top cylinder 52. A quick disconnect pair of clamping members 53 each pivoted on a pivot pin 54 supported on platform 10 have cutout portions to be received over the cylinders and secured by a quick detach thumbscrew toggle means generally indicated at 55.

The high-pressure supply from the high-pressure cylinders 49, 50 and 52 is to a manifold generally indicated at 56 which connects the cylinders through their respective cutoff valves 57, 58 and 59. Manifold 56 is connected by a conduit 60 to a first pressure reducing valve generally indicated at 61. A control cutoff valve 60a is interposed in the conduit 60. Pressure-reducing valve 61 is mounted on the support 44 and has a high-pressure gauge 62 indicating the pressure in the bank of cylinders and a reduced-pressure indicating gauge 63 indicating the reduced pressure to which the reducing valve is adjusted. A low-pressure discharge line 64 leads from the reducing valve 61 and through a T-connection 65 to a relatively low-pressure conduit 66 of a flexible type. This connects with the container 16 through a fitting assembly indicated generally at 67. Interior of the dry chemical powder container 16 is a pressure supply condiut 68 connected to fitting assembly 67 and directed toward the discharge and filling neck 17 at the discharge and filling portion 17' of the container 16. This positioning of the pressure supply conduit 68 is such that whirlpool action of the powder within container 16 is set up when pressure is applied. The bank of cylinders 49, 50 and 52 supply an inert gas such as nitrogen at a pressure in the neighborhood of 2000 lbs. per square inch and the first pressure-reducing valve 61 may be set to reduce the pressure to approximately 250 lbs. per square inch working pressure for the container 16.

A second pressure-reducing valve is indicated at 69 and it receives its supply pressure through a conduit 70 from the T-connection 65 and the pressure-reducing valve 61. This second pressure-reducing valve 69 reduces the pressure to about 160 lbs. per square inch and through the conduit 71 it is connected to supply reduced gas pressure to a control valve 72 having operating spring-biased position handle 73 and discharge conduits 74 and 75 leading to the ends of the power cylinder 38. Interposed in conduit 74 is a needle valve generally indicated at 76 for setting the pressure which controls the speed of actuation in inverting the cylinder 16.

In all of the conduits and fittings smooth uninterrupted bores are provided so that the pressure and flow of the gas and the powder carried thereby is unimpeded and the powder has free flow with no interruptions to and through the ultimate continuous flow hoses 30—31 and to the discharge nozzles 32 connected at the outer ends thereof.

The spring-biased control valve 72 is biased so that the control handle 73 is positioned to permit pressure to be applied through the needle valve 76 and the line 74 to the lower end of the power cylinder 38 to invert the container 16 when the shut-off valve 60a is opened in the high-pressure line 60. Thus, assuming that the respective valves 57, 58 and 59 on the gas cylinders are opened, all that is necessary to actuate the apparatus is to unlatch the handle 42 and open the valve 60a, thence pressure is applied through the conduit 68 to the container 16 to agitate and aerate the powder while the container 16 is being inverted and pressure carrying the finely-divided dry chemical powder is applied to the respective hoses 21 and 22 and thence to the discharge hoses 30 and 31. Thereafter, it is only necessary to open the valves 32' on the nozzles 32 and apply the dry chemical to the fire as necessary. Thus, the valve 60a is seen to provide a master control for simultaneously admitting gas to the container 16 and/or applying power to the motor 38 to invert the container.

In shutting down the system after use, the hose nozzles are closed and then the control handle 73 is moved to restore the container 16 to its upright position. This handle 73 of the valve 72 is held in this position against its spring-biasing means so that pressure is applied to the upper end of power cylinder 38. Manual assistance may be provided through the hand ring 33, if necessary. This may be necessary if the spherical container 16 has not been entirely discharged of powder. While still holding the control knob 73 of valve 72 against its biasing spring, the shut-off valve 60a is fully closed. Following this, the nozzles 32 are opened simultaneously and the hoses and their supply lines are completely cleared of dry-chemical by the residual air pressure that remains at the top portion 17' of container 16. In case only a small amount of the powder has been used, operating handle 73 of control valve 72 is held against its biasing spring to permit the powder to settle towards the bottom of the container 16 before the hose nozzles are vented. This action prevents siphoning off of the powder while clearing the hoses of any residual powder left therein.

A check for clearance of the powder transmission system in the hoses may be easily done. This is accomplished by opening the nozzles and merely blowing in one and checking for admission of air in the other nozzle.

This apparatus is easily maintained, is rugged and has proved to be very dependable. The powder supply that may stand unusued for a time is readily agitated by the inversion of the powder container and by the gas pressure supply thereto is readily aerated. No gas pockets are present in the system and the smooth flow bores in the powder transmission system provides for maximum effectiveness of the apparatus.

From the foregoing description it is seen that the valve 60a provides a master control by the operation of which pressure is applied to the container 16 while the container is being inverted. It is also seen that the pressure supply conduit 68 provides means for injecting gas within the top interior portion of the container near the location at which the hoses 21 and 22 are connected to the container.

I claim as my invention:

1. A dry chemical fire-extinguishing apparatus for supplying a stream of fluidized dry chemical comprising in combination: a normally upright pressure-resistant container for storing powdered dry chemical therein; discharge conduit means for discharging from said container a stream of fluidized dry chemical, said discharge conduit means terminating within the top interior portion of said container; normally closed first pressure-valve means in said discharge conduit means; gas injection means terminating within the top interior portion of said container near the location at which said discharge conduit means terminates for injecting a fluidizing stream of gas into said container; a source of gas under pressure; gas supply conduit means connecting said source to said gas injection means; normally closed second pressure-valve means in said gas supply conduit means; means mounting said container for pivotal movement from the upright position to an inverted position; motor means for pivoting said container from said upright position to said inverted position; master control means for operating said second pressure-valve means; and power means for driving said motor means; said power means being operably connected with said motor means and said master control means and responsive to the operation of said master control means to drive said motor; said master control means being operable for opening said second pressure-valve means and substantially simultaneously operating said power means to drive said motor means; whereby powdered dry chemical in said container is agitated and aerated by injection of a fluidizing stream of gas from said gas injection means and simultaneous pivotal movement of said container, and the powdered dry chemical is conditioned to issue from said discharge conduit means in a well fluidized stream upon opening said first pressure-valve means after said container has reached said inverted position.

2. A dry chemical fire-extinguishing apparatus for supplying a stream of fluidized dry chemical comprising in combination: a normally upright pressure-resistant container for storing powdered dry chemical therein; discharge conduit means for discharging from said container a stream of fluidized dry chemical, said discharge conduit means terminating within the top interior portion of said container; normally closed first pressure-valve means in said discharge conduit means; gas injection means terminating within the top interior portion of said container near the location at which said discharge conduit means terminates for injecting a fluidizing stream of gas into said container; a source of gas under pressure; first gas supply conduit means connecting said source to said gas injection means; means mounting said container for pivotal movement from the upright position to an inverted position; pneumatic motor means for pivoting said container from said upright position to said inverted position; second gas supply conduit means operatively connecting said pneumatic motor means to said first gas supply conduit means; and normally closed, master control, pressure-valve means in said first gas supply conduit means between said source of gas and the juncture of said first and second gas supply conduit means; whereby, when said master control, pressure-valve means is opened, a fluidizing stream of gas is injected into powdered dry chemical in said container as said container pivots from said upright position to said inverted position, and the powdered chemical is agitated and aerated by simultaneous action of said stream of gas and the pivotal movement of said container, and the powdered chemical is conditioned to issue from said discharge conduit means in a well fluidized stream upon opening said first pressure-valve means after said container has reached said inverted position.

3. A dry chemical fire-extinguishing apparatus as defined in claim 2 including a pressure-reducing valve in said first gas supply conduit means between said master control, pressure-valve means and the juncture of said first and second gas supply conduit means.

4. A dry chemical fire-extinguishing apparatus as defined in claim 2 including a first pressure-reducing valve in said first gas supply conduit means between said master control, pressure-valve means and the juncture of said first and second gas supply conduit means; and a second pressure-reducing valve in said second gas supply conduit means.

5. A dry chemical fire-extinguishing apparatus for supplying a stream of fluidized dry chemical comprising in combination: a normally upright pressure-resistant container for storing powdered dry chemical therein; discharge conduit means for discharging from said container a stream of fluidized dry chemical, said discharge conduit means terminating within the top interior portion of said container; normally closed first pressure-valve means in said discharge conduit means; gas injection means terminating within the top interior portion of said container near the location at which said discharge conduit means terminates for injecting a fluidizing stream of gas into said container; a source of gas under pressure; first gas supply conduit means connecting said source to said gas injection means; means mounting said container for pivotal movement from the upright position to an inverted position; reversible pneumatic motor means for selectively pivoting said container from said upright position to said inverted position and from said inverted position to said upright position; a control valve for said motor means; second gas supply conduit means connecting said control valve to said first gas supply conduit means; third gas supply conduit means connecting said motor means to said control valve for operating said motor means to pivot said container from said upright position to said inverted position; fourth gas supply conduit means connecting said motor means to said control valve for operating said motor to pivot said container from said inverted position to said upright position; said control valve normally being set to communicate said second gas supply conduit means with said third gas supply conduit means and movable to a setting to communicate said second gas supply conduit means with said fourth gas supply conduit means; normally closed, master control, pressure-valve means in said first gas supply conduit means between said source of gas and the juncture of said first and second gas supply conduit means; whereby, when said master control, pressure-valve means is opened, a fluidizing stream of gas in injected into powdered dry chemical in said container as said container pivots from said upright position to said inverted position, and the powdered chemical is agitated and aerated by simultaneous action of said stream of gas and the pivotal movement of said container, and the powdered chemical is conditioned to issue from said discharge conduit means in a well fluidized stream upon opening said first pressure-valve means after said container has reached said inverted position; and further whereby, after a portion of said powdered dry chemical has been discharged from said container and said first pressure-valve means has been closed, movement of said control valve for said motor means to said setting to communicate said second gas supply conduit means with said fourth gas supply conduit means pivots said container from said inverted position to said upright position wherein powdered dry chemical remaining in said container falls away from the top interior portion of said container, and, thereafter, upon closing said master control, pressure-valve means and then re-opening said first pressure-valve means said discharge conduit means is cleared of any powdered chemical therein by residual gas pressure in said container.

6. A dry chemical fire-extinguishing apparatus as defined in claim 5 including a pressure-reducing valve in said first gas supply conduit means between said master control, pressure-valve means and the juncture of said first and second gas supply conduit means.

7. A dry chemical fire-extinguishing apparatus as defined in claim 5 including a pressure-reducing valve in said first gas supply conduit means between said master control, pressure-valve means and the juncture of said first and second gas supply conduit means; and a needle valve in one of said third and fourth gas supply conduit means for adjusting the rate of pivoting of said container.

References Cited in the file of this patent

UNITED STATES PATENTS

| | | |
|---|---|---|
| 1,075,283 | Cooney | Oct. 7, 1913 |
| 1,314,387 | Choffel | Aug. 26, 1919 |
| 1,898,354 | Fickey | Feb. 21, 1933 |

UNITED STATES PATENT OFFICE

CERTIFICATE OF CORRECTION

Patent No. 2,923,360        February 2, 1960

Henry T. Porter

It is hereby certified that error appears in the printed specification of the above numbered patent requiring correction and that the said Letters Patent should read as corrected below.

Column 6, line 23, for "gas in" read -- gas is --.

Signed and sealed this 26th day of July 1960.

(SEAL)
Attest:

KARL H. AXLINE
Attesting Officer

ROBERT C. WATSON
Commissioner of Patents